(12) United States Patent
West et al.

(10) Patent No.: US 6,296,193 B1
(45) Date of Patent: Oct. 2, 2001

(54) CONTROLLER FOR OPERATING A DUAL DUCT VARIABLE AIR VOLUME TERMINAL UNIT OF AN ENVIRONMENTAL CONTROL SYSTEM

(75) Inventors: Jonathan D. West, Brown Deer; John E Seem, Glendale, both of WI (US)

(73) Assignee: Johnson Controls Technology Co., Plymouth, MI (US)

( * ) Notice: Subject to any disclaimer, the term of this patent is extended or adjusted under 35 U.S.C. 154(b) by 0 days.

(21) Appl. No.: 09/409,960

(22) Filed: Sep. 30, 1999

(51) Int. Cl.⁷ .................................................. G05D 23/00
(52) U.S. Cl. ............................................. 236/13; 236/1 B
(58) Field of Search ........................... 236/13, 1 B, 49.3, 236/12.15; 165/216

(56) References Cited

U.S. PATENT DOCUMENTS

| | | | |
|---|---|---|---|
| 2,254,185 | * 8/1941 | Newton | 257/3 |
| 2,292,335 | * 8/1942 | Durbin | 257/3 |
| 2,747,842 | * 5/1956 | Shataloff | 257/3 |
| 3,567,115 | * 3/1971 | Nelson | 236/1 |
| 3,612,164 | * 10/1971 | Miner | 165/22 |
| 3,901,310 | * 8/1975 | Strawn | 165/22 |
| 3,933,197 | * 1/1976 | Zimmer et al. | 165/2 |
| 4,013,118 | * 3/1977 | Zimmer et al. | 165/22 |
| 4,099,553 | * 7/1978 | Burnham et al. | 165/22 |
| 5,215,497 | 6/1993 | Drees | 454/61 |
| 5,350,113 | * 9/1994 | Coogan | 236/13 |
| 5,558,274 | 9/1996 | Ben-Aissa et al. | 236/13 |
| 5,931,227 | * 8/1999 | Graves | 165/216 |

* cited by examiner

*Primary Examiner*—Harry B. Tanner
(74) *Attorney, Agent, or Firm*—George E. Haas; Quarles & Brady LLP

(57) ABSTRACT

The flow air from a hot air duct and a cold air duct into a zone of a building is controlled in based upon performing a thermal energy balance calculation for the zone. That calculation produces a heat transfer setpoint from which a hot air flow setpoint and a cold air flow setpoint are derived. The hot and cold air flow setpoints respectively control the flow of air through the hot and cold air ducts.

12 Claims, 5 Drawing Sheets

| INDEX | COLD DUCT FLOW SETPOINT | HOT DUCT FLOW SETPOINT |
|---|---|---|
| 1 | COLD DUCT MIN FLOW | HOT DUCT HEATING MAX |
| 2 | COLD DUCT MIN FLOW | HOT DUCT HEATING MIN |
| 3 | COLD DUCT COOLING MIN | HOT DUCT MIN FLOW |
| 4 | COLD DUCT COOLING MAX | HOT DUCT COOLING MAX |

US 6,296,193 B1

CONTROLLER FOR OPERATING A DUAL DUCT VARIABLE AIR VOLUME TERMINAL UNIT OF AN ENVIRONMENTAL CONTROL SYSTEM

FIELD OF THE INVENTION

This invention relates generally to environmental control systems for heating, ventilating and air conditioning the interior of buildings; and more particularly, to apparatus for controlling circulation of conditioned air into a zone of a building.

BACKGROUND OF THE INVENTION

Heating, ventilating and air conditioning (HVAC) systems typically divide a large building into zones, and the HVAC system is adapted to maintain each of the zones within predefined environmental parameters (e.g., temperature, humidity, outdoor-recirculated air ratio, etc.). Each zone has a set of air distribution ducts connected to an air handling unit (AHU) that provides a supply of conditioned air to the particular zone. The air handling unit typically includes elements for introducing outdoor air into the distribution system and for exhausting air from the system. Elements also are provided to heat, cool, filter and otherwise condition the air for the zone, as well for circulating the air within the zone's air distribution ducts at a desired flow rate.

Air flow from the air handling unit to each room within the zone is regulated by a separate variable air volume (VAV) terminal unit, also called a VAV box. The typical variable air volume terminal unit has a damper driven by an actuator to vary the flow of air from the zone's air distribution duct. In a common air distribution system a single duct extends from the air handling unit to supply air at a given temperature to each variable air volume terminal unit. In order to provide air at the proper temperature for a given room, the variable air volume terminal unit has heating and cooling elements element.

The operation of the variable air volume terminal unit is provided by a VAV controller that must provide both continuous and discrete control functions. Continuous control includes a temperature loop and a flow loop, while discrete control includes the sequencing of the heating device.

Another type of air distribution system utilizes a pair of ducts to furnish heated and cooled air to each variable air volume terminal unit. The VAV terminal unit mixes air from both ducts to supply air at the proper temperature to the room. Conventional control of this dual duct system is based on sensing the temperature of the air at different point as described in U.S. Pat. No. 5,558,274.

SUMMARY OF THE INVENTION

The flow air from a hot air duct and a cold air duct into a zone of a building is controlled in based upon performing a thermal energy balance calculation for the zone. That calculation produces a heat transfer setpoint $Q_{sp}$ from which a hot air flow setpoint and a cold air flow setpoint are derived. Although the present invention is being described in terms of an air distribution system, its concepts can be applied to distribution systems for other fluids, such as for water.

In the preferred embodiment the thermal energy balance is calculated based upon a comparison of the measured temperature in the zone to a temperature setpoint which produces a temperature error signal. The heat transfer setpoint is derived from the temperature error signal. Preferably the hot cold air flow setpoints are derived from the heat transfer setpoint, the temperature of air in the hot air duct and the temperature of air in the cold air duct.

The flow of air from the hot air duct is controlled in response to the hot air flow setpoint and the flow of air from the cold air duct is controlled in response to the cold air flow setpoint. Preferably the hot air flow is varied in response to a comparison of the hot air flow setpoint to a measurement of air flow through the hot air duct, and cold air flow is varied in response to a comparison of the cold air flow setpoint to a measurement of air flow through the cold air duct.

DETAILED DESCRIPTION OF THE INVENTION

Figure 1:
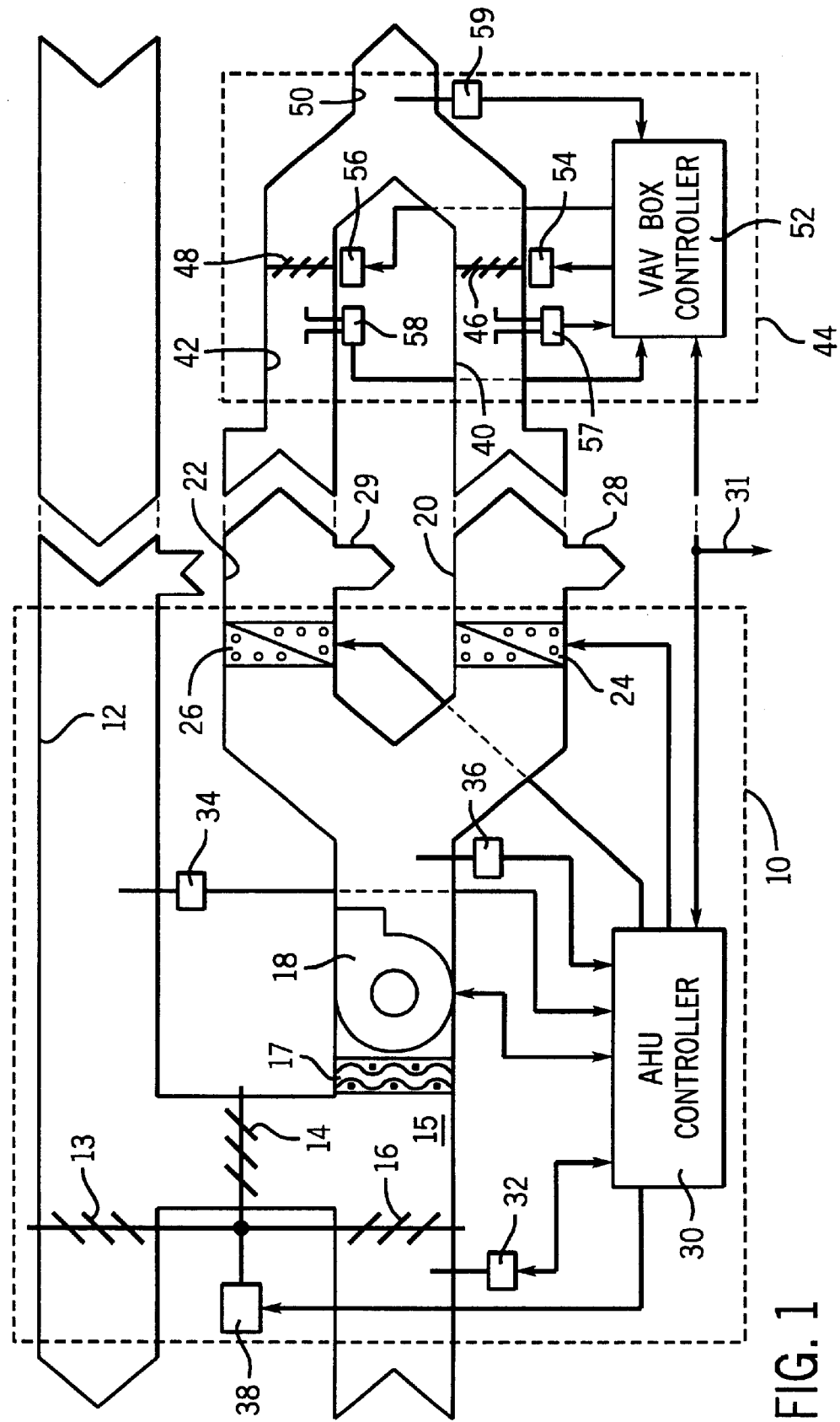
FIG. 1 is a block diagram of the HVAC components for a zone of a building.

With initial reference to FIG. 1, a zone of a building is supplied with conditioned air by an air handling unit 10 that receives air through a return air duct 12 from rooms within the zone. Depending on the positions of an exhaust damper 13 and a recirculation damper 14, the return air may be exhausted outside the building or go from the return air duct 12 to a mixing chamber 15, becoming recirculated air. In addition fresh outside air, drawn through inlet damper 16, enters the mixing chamber 15 and combines with the recirculated air. The mixture then is drawn through a filter 17 by a supply fan 18. The temperatures and the ratio of flow rates of the outdoor and recirculated air streams determine the condition of the air at the mixing chamber outlet.

The air mixture in chamber 15 is drawn through a filter 17 by a supply fan 18. The stream of mixed air from the fan 18 is divided into a hot air plenum 20 and a cold air plenum 22. A heating coil 24 is located in the hot air plenum 20 to raise the temperature of that portion of the air stream to a desired temperature. The cold air plenum 22 similarly contains a cooling coil 26 to lower the air temperature as desired. The hot and cold air plenums 20 and 22 then pass through the building zone with smaller lateral ducts 28 and 29 branching off to each room of the zone.

The dampers 13, 14 and 16, heating coil 24, and cooling coil 26 of air-handling unit 10 are operated by a feedback controller 30 having control logic which determines the proper combination of system components to activate for maintaining the air supplied to the zone at a desired temperature. The controller 30 may be connected to a network 31 for the exchange of data with other devices of the building's HVAC system. The controller 30 implements a control strategy which regulates the mixture of outside air with mechanical cooling and heating provided by the coils 24 and 26 to efficiently condition the air being supplied to the rooms. Such control is predicated on receiving accurate sensor data regarding conditions in the rooms and outside the building, as well as within the air handling unit 10. The controller 30 receives input signals from outdoor air temperature sensor 32, a return air temperature sensor 34 and a supply air temperature sensor 36 produces a signal which indicates the temperature of the air being fed to the plenums 20 and 22. In response to these input signals, the controller operates valves that control the flow of hot and cold water to the coils 24 and 26 and also operates an actuator 38 for the dampers 13, 14 and 16.

A lateral hot air duct 40 branches from the hot air plenum 20 to a VAV terminal unit 44 for one room in the zone and a lateral cold air duct 42 extends from the cold air plenum 22 to the VAV terminal unit. The hot air duct 40 and cold air duct 42 are also known as a hot deck and a cold deck and serve as separate conduits for the heated and cooled air. The hot air duct 40 has a hot air damper 46 which regulates the flow of heated air into the room. Similarly the flow of cooled air into the room is regulated by a cold air damper 48 in the cold duct 42. The hot and cold ducts 40 and 42 then converge into a single outlet duct 50 through which conditioned air is supplied to the room.

The VAV terminal unit 44 contains its own controller 52 which operates the actuators 54 and 56 for the hot and cold dampers 46 and 48, respectively. The flow rates of air through respective dampers 46 and 48 are measured by sensors 57 and 58, respectively. The temperature of the air leaving the VAV terminal unit 44 is measured by a temperature sensor 59.

Figure 2:
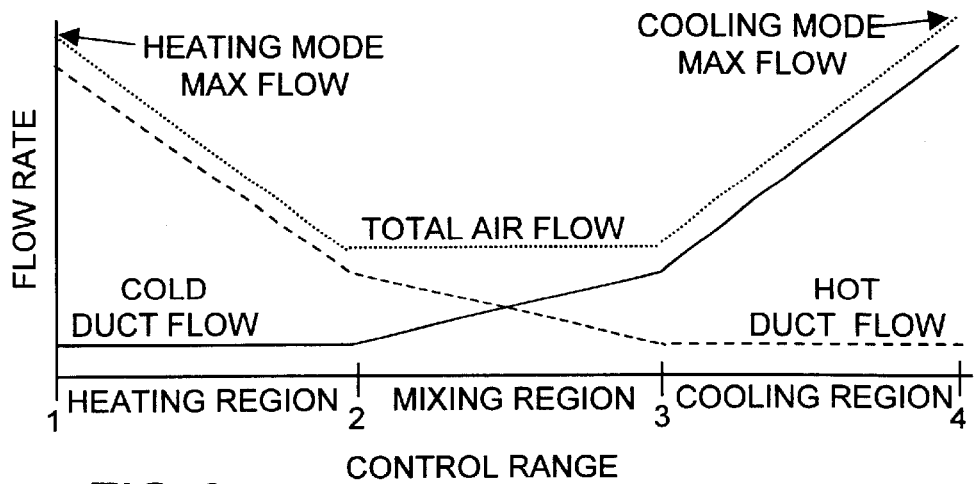
FIG. 2 is a graph depicting the hot and cold air flow through a VAV terminal unit operating in a single temperature setpoint mode in which a varying volume of air supplied to the building zone.

The VAV terminal unit 44 can be configured to deliver either a variable volume of air depending upon the amount of heating or cooling required or a constant volume of air to the building zone. For the variable volume configuration, depicted graphically in FIG. 2, a single temperature setpoint is defined for the air within the building zone and the controller maintains the air at that temperature using a single mode of control throughout the entire control range. As will be described, this is accomplished utilizing a single set of tuning parameters for a proportional-integral-derivative (PID) control algorithm. In the control region between indices 1 and 2, the controller modulates the flow from the hot air duct using hot air duct damper 46 to maintain the zone temperature at the temperature setpoint. In this control region, the cold air duct damper 48 is held in a minimum flow position. Between indices 2 and 3, the flows from both the hot and cold ducts are modulated so that air from those ducts mixes to maintain the zone temperature. Above index 3, only the air flow from the cold duct is modulated using cold air duct damper 48 to maintain the temperature in the building zone at the setpoint. In this control region, the hot air duct damper 46 is held in a minimum flow position.

Figure 3:
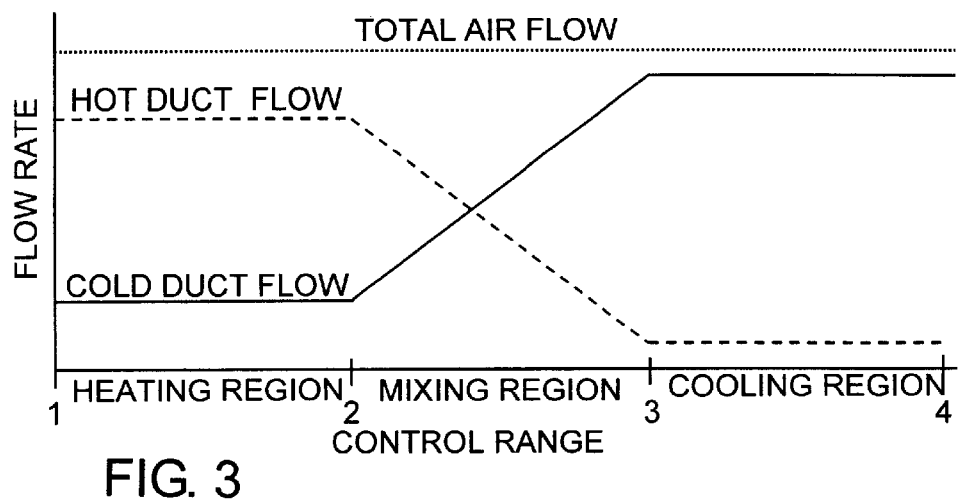
FIG. 3 is a graphical depiction of the hot and cold air flow through a VAV terminal unit in a single temperature setpoint in which a constant volume of air supplied to the building zone.

FIG. 3 illustrates the present control methodology applied to a constant air volume terminal unit in which the control algorithm operates between indices 2 and 3 due to the manner in which the flow setpoints are defined. In this case, the hot and cold air duct dampers 46 and 48 are modulated so that air from both ducts is mixed to maintain the zone temperature at the temperature setpoint.

Figure 4:
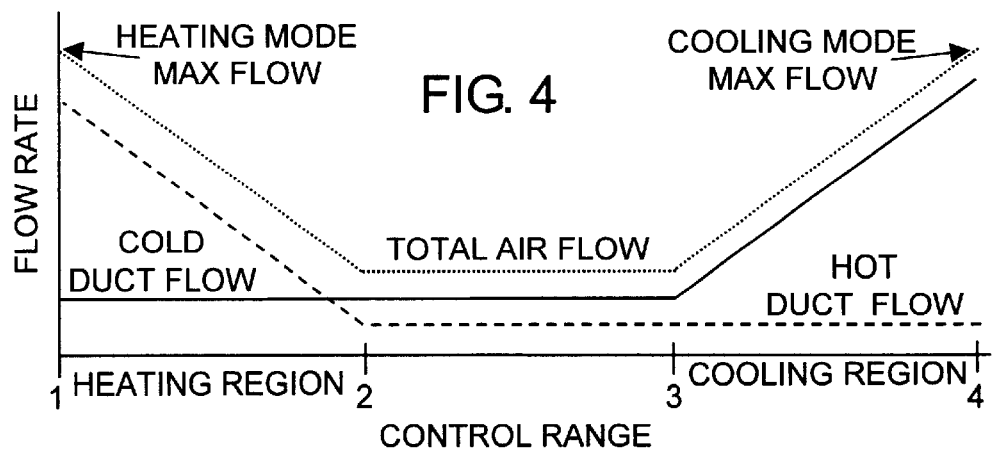
FIG. 4 is a graph depicting the hot and cold air flow through a VAV terminal unit operating in a dual temperature setpoint mode in which a varying volume of air supplied to the building zone.

FIG. 4 depicts two temperature setpoint control as is used for an unoccupied zone of the building where minimum heating and cooling is required. In that situation, the temperature is controlled so that it does not go below a lower temperature setpoint at control index 2, or above an upper temperature setpoint at control index 3. The zone temperature is allowed to fluctuate between the lower and upper temperature setpoints. The present invention enables this control configuration to be implemented with a single set of tuning parameters for a proportional-integral-derivative (PID) control algorithm.

The control process in these control configurations is based on the rate of heat transfer to the building zone. One advantage of this paradigm over the prior VAV control systems, which used three PID algorithms for the three regions of the control range, is that the present system removes the artificial barriers between those regions. By utilizing a single energy balance PID algorithm spanning the entire control range, the conversion from the heat transfer rate to flow setpoints linearizes the gain of the controller 52 and is independent of the gain of each control range region. This means that the tuning parameters determined in any control region are applicable to the entire air flow control domain.

Figure 5A:
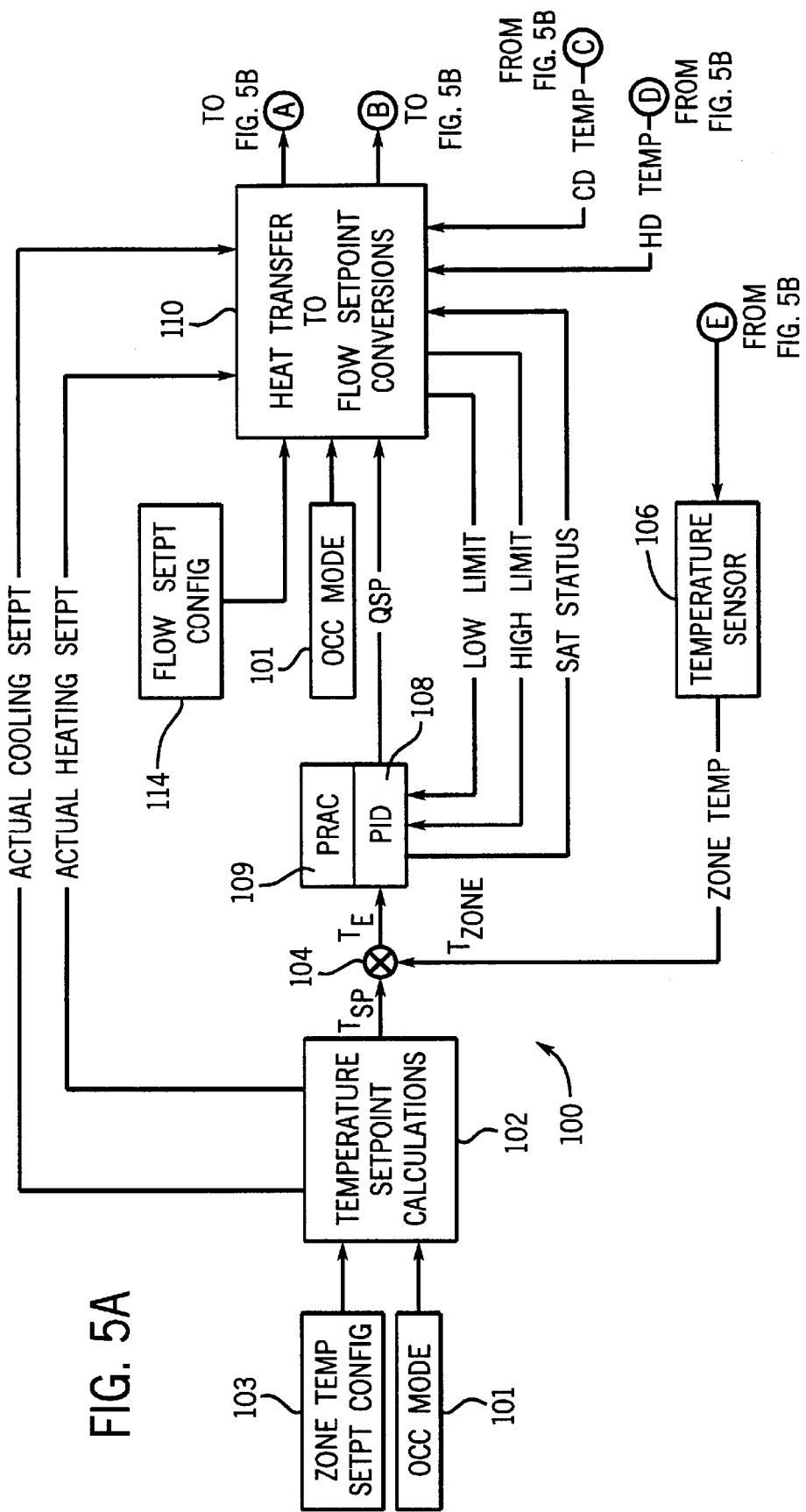
FIGS. 5A and 5B form a diagram of a control process that is implemented by the VAV terminal unit to regulate the building zone environment.
Figure 5B:
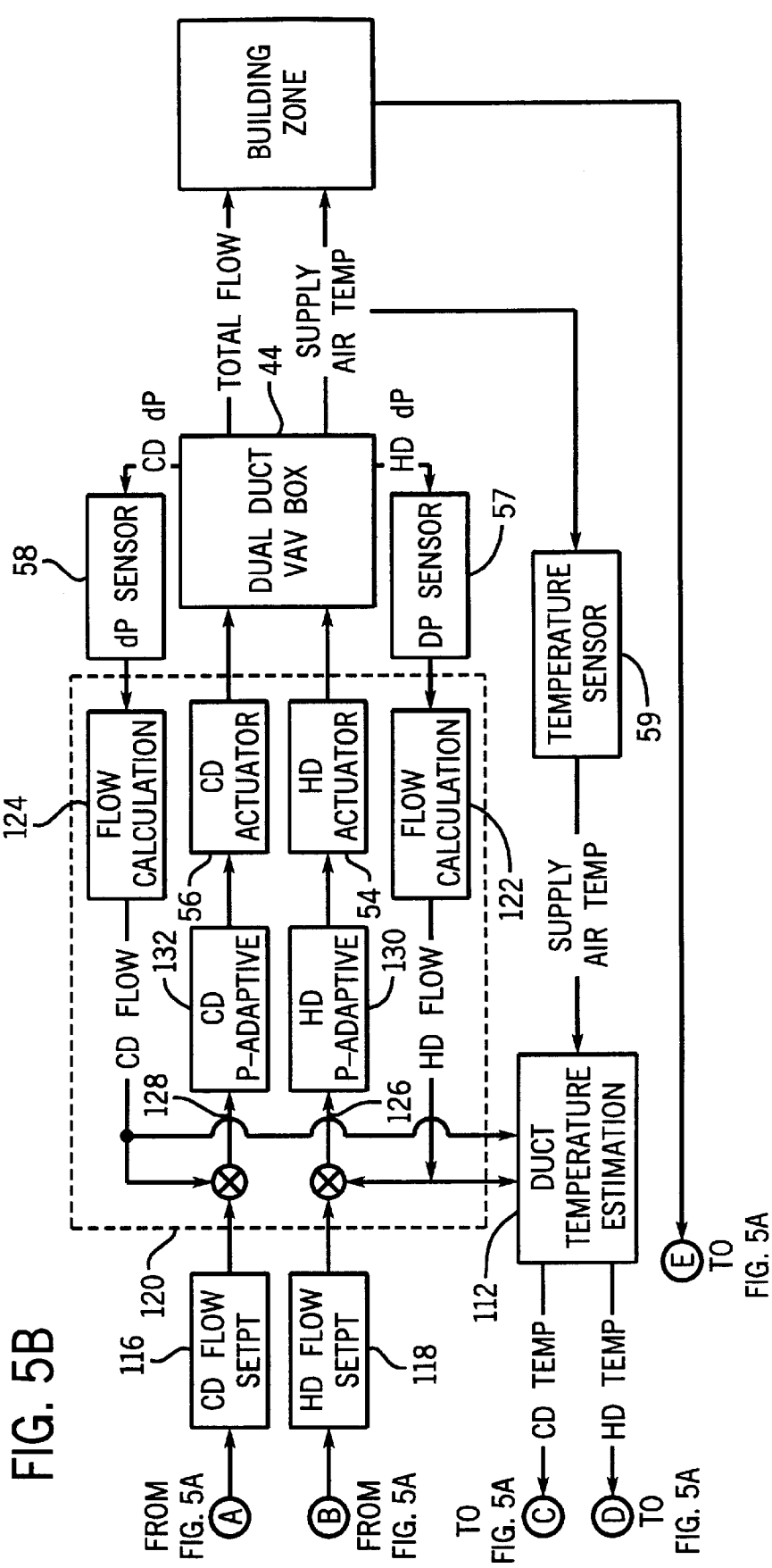

This novel operation of the VAV terminal unit 44 is represented by the control diagram 100 in FIGS. 5A and 5B. Commencing with FIG. 5A, the heating and cooling setpoints for the building zone are calculated at 102. The calculation is based on the current occupancy mode 101, such as occupied, unoccupied or standby modes, and a designation of a desired temperature 103 for the zone at the present time of day. This data may be provided by manual inputs from the zone or from a supervisory controller for the building and received by the VAV terminal unit via the communication network 31. Based on the time of day and the zone occupancy mode, the zone set point calculation 102 produces the actual heating and cooling temperature set points for each duct 40 and 42 and a desired temperature setpoint $T_{sp}$ which is applied as an input to a feedback summing node 104. The temperature setpoint $T_{sp}$ is combined at feedback summing node 104 with the actual temperature from the zone $T_{ZONE}$ as measured by a temperature sensor 106 that is located in the zone. The difference between those inputs ($T_{sp}$ and $T_{ZONE}$) produces a temperature error signal $T_E$ that is applied to an input of a proportional-integral-derivative (PID) control algorithm 108.

The PID algorithm 108 is designed for the non-uniform sampling conditions of asynchronous operating environments and is used for a primary loop of a cascaded feedback control to determine the air flow set points for the hot and cold ducts 40 and 42. A pattern recognition adaptive control (PRAC) algorithm 109 automatically adjusts the proportional band and integral time of the PID control algorithm 108 based on patterns of sensed values from the process output, setpoint, and the output of the PID controller. Pattern recognition adaptive control is well known and has been employed in HVAC systems as described in U.S. Pat. Nos. 5,355,305 and 5,506,768. The PRAC 109 can be enabled and disabled by a software command and will disable itself at saturation, upon unreliability of the zone sensor data (which is detected by the PID and then passed to the PRAC algorithm). If a value other than zero for the derivative time is detected in the PID process, the PRAC will not attempt to tune the PID control algorithm. Upon being disabled, the PRAC 109 retains its last values for the proportional band and integral time to be used as initial values when it is restarted.

The PID control algorithm 108 with PRAC 109 responds to the temperature error $T_E$ by computing a setpoint for the heat transfer rate ($Q_{sp}$) defined as:

$$Q_{SP} = K\left(e(t) + \frac{1}{T_i}\int_0^t e(t)\,dt\right)$$

where K is a constant. The heat transfer rate setpoint is the heat transfer rate required in order to nullify the temperature error, in other words, in order to bring the temperature of the building zone to the desired temperature setpoint. The value of $Q_{sp}$ is between minimum and maximum values for the heat transfer rate as determined by the design of the VAV terminal unit 44.

The heat transfer setpoint $Q_{sp}$ is applied as an input to a heat transfer to flow setpoint conversion algorithm 110 which receives the actual cooling and heating setpoints from the zone setpoint calculations 102, as well as the occupancy mode 101 and a flow setpoint configuration 114. As will be described, estimations of the cold duct (CD) temperature and the hot duct (HD) temperature are also applied as input to the heat transfer to flow setpoint conversion algorithm 110.

Figures 6, 7:
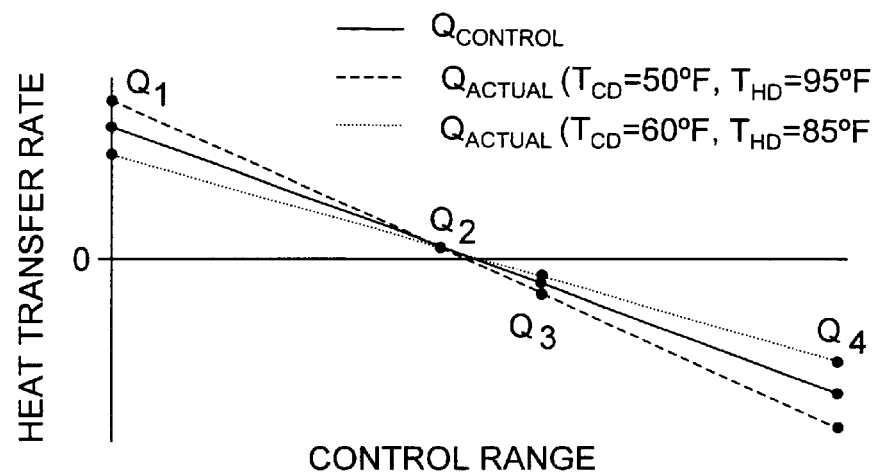
FIG. 6 depicts a table of air flow configuration data stored in a memory of the controller for the VAV terminal unit.
FIG. 7 is a graph of the relationship between the heat transfer rate and the control range of the control process.

The flow setpoint configuration 114 is a set of data that defines the air flow through the hot and cold ducts 40 and 42 based on a flow schedule programmed into the controller 52 during installation of the VAV terminal unit 44. For example, if the installer selects a variable air volume configuration as shown in FIG. 3, the flow schedule is defined by the values stored in the flow setpoint configuration 114 which establish the three control range regions of heating, mixing and cooling. In this instance, the configuration is specified by values for the cold duct and hot duct air flows at each of the four control range indices on the selected flow schedule. Those index values are stored in the memory of the controller 52 as a table which is depicted in FIG. 6.

This configuration process commences by the installer first defining values for the minimum air flow ($\dot{\omega}_{BOX\ MIN}$) from the VAV terminal unit (box) 44, heating mode maximum air flow ($\dot{\omega}_{HM\ MAX}$) the cooling mode maximum air flow ($\dot{\omega}_{CM\ MAX}$), cold duct minimum air flow ($\dot{\omega}_{CD\ MIN}$) and hot duct minimum air flow ($\dot{\omega}_{HD\ MIN}$) Those parameter values are employed to derive air flow values for the configuration table parameters including cold duct maximum air flow in the cooling mode ($\dot{\omega}_{CD\ COOLING\ MAX}$), cold duct minimum air flow in the cooling mode ($\dot{\omega}_{CD\ COOLING\ MAX}$), hot duct maximum air flow in the heating mode ($\dot{\omega}_{HD\ HEATING\ MAX}$), and hot duct minimum air flow in the heating mode ($\dot{\omega}_{HD\ HEATING\ MIN}$) These parameters are calculated according to the following equations:

$$\dot{\omega}_{CD\ COOLING\ MAX} = \dot{\omega}_{CM\ MAX} - \dot{\omega}_{HD\ MIN}$$

$$\dot{\omega}_{CD\ COOLING\ MIN} = \dot{\omega}_{BOX\ MIN} - (\dot{\omega}_{HD\ MIN})$$

$$\dot{\omega}_{HD\ HEATING\ MAX} = (\dot{\omega}_{HM\ MAX}) - \dot{\omega}_{HD\ MIN}$$

$$\dot{\omega}_{HD\ HEATING\ MIN} = (\dot{\omega}_{BOX\ MIN}) - \dot{\omega}_{CD\ MIN}$$

All of these flow parameters are stored in the memory of controller 52 as the setpoint configuration 114 and are employed to set the flow rates for the two ducts 40 and 42 at each of the control range indices 1, 2, 3, and 4.

The heat transfer setpoint $Q_{sp}$ of the energy balance algorithm is converted into hot and cold duct flow setpoints at 110 based upon the hot and cold duct temperatures, the zone temperature setpoint and the flow setpoint configuration 114.

The actual heat transfer to the building zone can be calculated by performing an energy balance on the zone. Assuming that the zone has a uniform temperature near the setpoint and that the same volume of air as supplied to the zone also leaves the zone, the heat transfer $\dot{Q}$ in units of Btu per hour is given by the expression:

$$\dot{Q} = 1.08(\dot{\omega}_{CD}(T_{CD} - T_{ZONE\ SP}) + \dot{\omega}_{HD}(T_{HD} - T_{ZONE\ SP})) \quad (1)$$

where $T_{CD}$ is the cold duct temperature, $T_{HD}$ is the hot duct temperature, $T_{CD}$ is the measured cold duct flow rate, $\dot{\omega}_{HD}$ is the measured hot duct flow rate, and $T_{ZONE\ SP}$ is the temperature setpoint for the active occupancy mode. From this equation it is apparent that a net heat transfer to the zone (heating) is positive and a net heat transfer from the zone (cooling) is negative.

The energy balance conversion requires the temperature of the hot and cold ducts. If these temperatures are known exactly, then the conversion from an energy balance setpoint $Q_{sp}$ to individual flow setpoints will yield a perfectly linear system. However, standard dual duct VAV terminal units do not have temperature sensors in the hot and cold ducts and adding a pair of sensors would increase the cost of the unit. Furthermore, by not requiring additional sensors, the present control technique may to be retrofitted into existing VAV terminal units merely by reprogramming the controller 52. In order to accomplish that, the software for the controller 52 estimates the hot and cold duct temperatures. However, when the estimated temperatures are different from the actual duct temperatures, the actual heat transferred to the zone differs from that predicted by the controller resulting the control process becoming slightly non-linear.

Referring to FIG. 5B, the supply duct temperature estimation algorithm 112 is based on a recursive parameter estimation technique as described by Lung, Lennart and Soderstrom, *Theory and Practice of Recursive Identification*, The MIT Press, (1983). The estimation technique determines the hot and cold duct temperatures from the temperature sensor 59 located in the outlet duct 50 of the VAV terminal unit 44 and the flow rates through the hot and cold ducts. The recursive parameter estimation method also combines covariance resetting, exponential forgetting, and conditional updating as described by Astrom, Johan and Wittenmark, *Adaptive Control, Second Edition*, Addison-Wesley Publishing Co., (1995). Exponential forgetting allows the recursive parameter estimation to track slowly time varying processes. In some dual-duct VAV terminal units, hot or cold duct temperatures may change abruptly and covariance resetting allows the parameter estimation algorithm to track such abrupt changes. Simulation studies on a particular VAV terminal unit are used to determine the initial values for the covariance matrix and the threshold for resetting the covariance matrix. The conditional updating prevents the recursive parameter estimation from becoming numerically unstable.

The algorithm for performing recursive least squares with exponential forgetting, covariance resetting and conditional updating commences by initializing the variables. The covariance matrix is set to an initial value $P_{init}$ which is given by:

$$P_{INIT} = \begin{bmatrix} 50 & 0 \\ 0 & 50 \end{bmatrix}$$

The exponential forgetting factor $\lambda$ is set to 0.98 and the vector $\theta$ for the initial estimation of the cold and hot duct temperatures is defined as:

$$\theta = \begin{bmatrix} T_{COLD,INIT} \\ T_{HOT,INIT} \end{bmatrix}$$

The identity matrix I is defined as:

$$I = \begin{bmatrix} 1 & 0 \\ 0 & 1 \end{bmatrix}$$

Then the inputs from the VAV terminal unit sensors 57, 58 and 59 are recorded, where $F_{HOT}$ is the hot duct flow rate from sensor 57, $F_{COLD}$ is the cold duct flow rate from sensor 58 and $T_{mix}$ is the mixed air temperature measured by sensor 59. From these measurements the fraction f of hot and cold air in the output air mixture is calculated according to the expressions:

$$f_{HOT} = \frac{F_{HOT}}{F_{HOT} + F_{COLD}}$$

$$f_{COLD} = \frac{F_{COLD}}{F_{HOT} + F_{COLD}}$$

Then the matrix $\phi$ is updated whereby:

$$\varphi = \begin{bmatrix} f_{COLD} \\ f_{HOT} \end{bmatrix}$$

The steps of the recursive least squares function with exponential forgetting, covariance resetting and conditional updating then is performed as follows. First an estimation error $\epsilon$ is derived $$\epsilon = T_{MIX} - \phi^T \theta.$$

where T designates the transpose of a matrix. If the absolute value of the estimation error is greater than 0.5 then the covariance P is reset to the initial value $P_{init}$.

Updating may occur when $\phi^T P \phi > 2(1-\lambda)$ in which case the gain factor K is computed:

$$K = \frac{P\varphi}{\lambda + \varphi^T P \varphi}$$

The new hot and cold duct temperatures then can be estimated according to the expression $\theta_{NEW} = \theta + K\epsilon$ and the P matrix is updated according to:

$$P_{NEW} = \frac{1}{\lambda}(I - K\varphi^T P)$$

Because the source temperature estimation seeks to minimize the error of the estimated discharge air temperature, the hot and cold duct temperature estimations will tend to have errors of opposite signs. That is, if the estimated hot duct temperature is above the actual hot duct temperature then the estimated cold duct temperature will likely be less than the actual cold duct temperature. With source temperature errors of this type, the gain of the heat transfer predictions are very linear across the entire control domain, but have a different slope then that calculated using the actual duct temperatures as shown in FIG. 7. The PRAC will tune the PID algorithm accordingly so the difference in gain will have little effect on the final control.

The heat transfer at each control range index is calculated using Equation (1) with the flow setpoint configuration 114. The heating setpoint is active at control indices 1 and 2, while the cooling setpoint is active at control indices 3 and 4. The equations at each Index are:

$$\dot{Q}_1 = 1.08(\dot{\omega}_{CD\ MIN}(T_{CD} - T_{HEATING\ SP}) + \dot{\omega}_{HD\ HEATING\ MAX}(T_{HD} - T_{HEATING\ SP}))$$

$$\dot{Q}_2 = 1.08(\dot{\omega}_{CD\ MIN}(T_{CD} - T_{HEATING\ SP}) + \dot{\omega}_{HD\ HEATING\ MAX}(T_{HD} - T_{HEATING\ SP}))$$

$$\dot{Q}_3 = 1.08(\dot{\omega}_{CD\ COOLING\ MIN}(T_{CD} - T_{COOLING\ SP}) + \dot{\omega}_{HD\ MIN}(T_{HD} - T_{COOLING\ SP}))$$

$$\dot{Q}_4 = 1.08(\dot{\omega}_{CD\ COOLING\ MAX}(T_{CD} - T_{COOLING\ SP}) + \dot{\omega}_{HD\ COOLING\ MAX}(T_{HD} - T_{COOLING\ SP}))$$

Once the heat transfer rates $\dot{Q}_1$, $\dot{Q}_2$, $\dot{Q}_3$, and $\dot{Q}_4$ are determined for each of the four control indices 1, 2, 3 and 4, the flow setpoint for each input duct is derived using linear interpolation. For example, if the energy balance PID algorithm specifies a heat transfer rate setpoint $\dot{Q}_{SP}$ that is between control indices 1 and 2 (i.e. having a value between $Q_1$ and $Q_2$), the cold duct flow setpoint is set equal to the Cold Duct Minimum Flow rate (see FIG. 3) and the Hot Duct Flow Setpoint is set according to the expression:

$$HotDuctFlowSetpoint = \dot{\omega}_{HD\ HEATING\ MIN} + (\dot{\omega}_{HD\ HEATING\ MAX} - \dot{\omega}_{HD\ HEATING\ MIN})\dot{Q}_{SP} - \frac{\dot{Q}_2}{\dot{Q}_1 - \dot{Q}_2}$$

The cold and hot duct flow setpoints then are stored as represented at 116 and 118 on FIG. 5B of the control diagram. These setpoints provide inputs to the flow control section 120 of the control process 100. In addition, section 120 receives the measurements of the flow rates in the hot and cold ducts 40 and 42 via the separate sensors 57 and 58, respectively. From the sensor signals which indicate a pressure differential (dP) the flow control section 120 calculates the hot duct flow at section 122 and the cold duct flow at section 124. Both of these flow rate measurements are combined with their respective flow setpoints to produce separate hot and cold duct flow error signals at points 126 and 128, respectively. Each of the flow error signals is applied to a separate P-adaptive control algorithm 130 and 132 thereby producing outputs which are used to control the actuators 54 and 56 on the respective dampers 46 and 48 in the hot and cold ducts 40 and 42 (FIG. 1). This controls the flow of air from each of the ducts 40 and 42 to the outlet duct 50 supplying air to the building zone. As noted in FIG. 5B the measurements of the cold duct and hot duct flow rates are also applied as inputs to the temperature estimation algorithm 112.

We claim:

1. A method for controlling flow of fluid from a hot fluid conduit and a cold fluid conduit that environmentally controls a zone of a building, said method comprising:

performing a thermal energy balance calculation for the zone thereby producing a heat transfer setpoint $Q_{sp}$, which indicates a desired heat transfer rate;

in response to the heat transfer setpoint, deriving a hot fluid flow setpoint and a cold fluid flow setpoint which respectively indicate desired flow rates of the hot fluid from the hot fluid conduit and of the cold fluid from the cold fluid conduit;

controlling flow of hot fluid from the hot fluid conduit in response to the hot fluid flow setpoint; and controlling flow of cold fluid from the cold fluid conduit in response to the cold fluid flow setpoint.

2. The method as recited in claim 1 wherein the step of performing a thermal energy balance for the zone comprises:

sensing a temperature within the zone to produce a sensed temperature value $T_{ZONE}$;

comparing the sensed temperature value to a temperature setpoint $T_{SP}$, thereby producing a temperature error signal $T_E$; and deriving a heat transfer setpoint $Q_{SP}$ in response to the temperature error signal.

3. The method as recited in claim 1 wherein the hot fluid flow setpoint and the cold fluid flow setpoint are derived further in response to a first temperature of fluid in the hot fluid conduit and to a second temperature of fluid in the cold fluid conduit.

4. The method as recited in claim 3 wherein the first temperature and the second temperature are estimated in response to a first flow rate of fluid through the hot fluid conduit, a second flow rate of fluid through the cold fluid conduit, and a third temperature of a mixture of fluids from the hot fluid conduit and the cold fluid conduit.

5. The method as recited in claim 4 wherein the first temperature and the second temperature are estimated using covariance resetting, exponential forgetting, and conditional updating.

6. The method as recited in claim 1 wherein controlling flow of hot fluid from the hot fluid conduit comprises:

sensing a flow of fluid through the hot fluid conduit to produce a hot fluid flow value;

comparing the hot fluid flow value to the hot fluid flow setpoint thereby producing a hot fluid flow error value; and altering the flow of fluid through the hot fluid conduit in response to the hot fluid flow error value.

7. The method as recited in claim 1 wherein controlling flow of cold fluid from the cold fluid conduit comprises:

sensing a flow of fluid through the cold fluid conduit to produce a cold fluid flow value;

comparing the cold fluid flow value to the cold fluid flow setpoint thereby producing a cold fluid flow error value; and altering the flow of fluid through the cold fluid conduit in response to the cold fluid flow error value.

8. A method for controlling flow air from a terminal unit which receives air from a hot air duct and a cold air duct and which has an outlet from which air is supplied to a zone of a building, said method comprising:

sensing a temperature within the zone to produce a sensed temperature value $T_{ZONE}$;

comparing the sensed temperature value to a temperature setpoint Tsp thereby producing a temperature error signal $T_E$;

deriving a heat transfer setpoint $Q_{SP}$ in response to the temperature error signal;

determining a first temperature of air received from the hot air duct and a second temperature of air received from the cold air duct;

deriving a hot air flow setpoint and a cold air flow setpoint in response to the heat transfer setpoint, the first temperature, and the second temperature;

controlling flow of air from the hot air duct in response to the hot air flow setpoint; and controlling flow of air from the cold air duct in response to the cold air flow setpoint.

9. The method as recited in claim 8 wherein the first temperature and the second temperature are estimated in response to a first flow rate of air from the hot air duct, a second flow rate of air from the cold air duct, and a third temperature of air flowing through the outlet.

10. The method as recited in claim 9 wherein the first temperature and the second temperature are estimated using covariance resetting, exponential forgetting, and conditional updating.

11. The method as recited in claim 8 wherein controlling flow of air from the hot air duct comprises:

sensing a flow of air from the hot air duct to produce a hot air flow value;

comparing the hot air flow value to the hot air flow setpoint and producing a hot air flow error value; and altering the flow of air from the hot air duct in response to the hot air flow error value.

12. The method as recited in claim 8 wherein controlling flow of air from the cold air duct comprises:

sensing a flow of air from the cold air duct to produce a cold air flow value;

comparing the cold air flow value to the cold air flow setpoint and producing a cold air flow error value; and altering the flow of air from the cold air duct in response to the cold air flow error value.

* * * * *